US012657174B2

(12) United States Patent
Tu et al.

(10) Patent No.: US 12,657,174 B2
(45) Date of Patent: Jun. 16, 2026

(54) STORAGE MANAGEMENT METHODS AND APPARATUSES FOR DISTRIBUTED DATABASE

(71) Applicant: Beijing OceanBase Technology Co., Ltd., Beijing (CN)

(72) Inventors: Yunshan Tu, Beijing (CN); Yuzhong Zhao, Beijing (CN); Jiahua Chen, Beijing (CN); Saitong Zhao, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 76 days.

(21) Appl. No.: 18/475,902

(22) Filed: Sep. 27, 2023

(65) Prior Publication Data

US 2024/0104073 A1    Mar. 28, 2024

(30) Foreign Application Priority Data

Sep. 27, 2022    (CN) .......................... 202211178127.3

(51) Int. Cl.
*G06F 16/22* (2019.01)
*G06F 16/27* (2019.01)
(52) U.S. Cl.
CPC .............. *G06F 16/22* (2019.01); *G06F 16/27* (2019.01)
(58) Field of Classification Search
CPC ...................................................... G06F 16/22
See application file for complete search history.

(56) References Cited

U.S. PATENT DOCUMENTS

| | | | | |
|---|---|---|---|---|
| 11,113,296 | B1 * | 9/2021 | Edara .................. | G06F 16/2477 |
| 12,086,711 | B2 * | 9/2024 | Zheng .................... | G06N 3/063 |
| 2016/0371339 | A1 * | 12/2016 | Paddon .............. | G06F 16/2457 |
| 2017/0031933 | A1 * | 2/2017 | Xie ........................ | G06F 16/128 |
| 2017/0123676 | A1 * | 5/2017 | Singhai ................ | G06F 3/0608 |
| 2018/0089218 | A1 * | 3/2018 | Yan ......................... | G06F 3/067 |
| 2018/0364949 | A1 * | 12/2018 | Aston .................... | G06F 3/067 |
| 2019/0026042 | A1 | 1/2019 | Gupta et al. | |
| 2019/0251275 | A1 * | 8/2019 | Ramrakhyani ..... | G06F 21/6218 |
| 2019/0286532 | A1 * | 9/2019 | Guo ..................... | H04L 9/3239 |

(Continued)

FOREIGN PATENT DOCUMENTS

| | | |
|---|---|---|
| CN | 109375872 | 2/2019 |
| CN | 111066011 | 4/2020 |

(Continued)

*Primary Examiner* — Mohammad S Rostami
(74) *Attorney, Agent, or Firm* — Fish & Richardson P.C.

(57) ABSTRACT

Storage management by a target node for a distributed database includes sending, except the target node, a block query request to n–1 nodes of n nodes of a distributed jointly using a target memory storing some data blocks. N–1 to-be-reclaimed data block sets are received can combined with a to-be-reclaimed data block set maintained by the target node to obtain a combined data block set which is sent to the n–1 nodes. Each of the n–1 nodes removes a data block from the combined data block set and provides an obtained filtered data block set to the target node. The obtained filtered data block set and an n–1 filtered data block set sent by the n–1 nodes as n target data block sets is used by the target node. An overlapping data block of the n target data block sets is determined. The overlapping data block is reclaimed.

20 Claims, 5 Drawing Sheets

(56)                    References Cited

U.S. PATENT DOCUMENTS

| | | | | |
|---|---|---|---|---|
| 2020/0042607 | A1* | 2/2020 | Mitsuma | G06F 16/119 |
| 2020/0233799 | A1* | 7/2020 | Ding | G06F 12/0868 |
| 2021/0103586 | A1* | 4/2021 | Quamar | G06N 20/00 |
| 2021/0135850 | A1* | 5/2021 | Hoang | H04L 9/085 |
| 2021/0303457 | A1* | 9/2021 | Pasquale | G06F 3/0679 |
| 2022/0245173 | A1* | 8/2022 | Huang | G06F 16/9024 |
| 2023/0114199 | A1* | 4/2023 | Jang | G06F 3/061 |
| | | | | 711/154 |
| 2023/0144556 | A1* | 5/2023 | Zhao | G06F 7/4876 |
| | | | | 708/190 |
| 2023/0239159 | A1* | 7/2023 | Ge | G06F 9/5016 |
| 2025/0038726 | A1* | 1/2025 | Yang | H03G 3/3089 |

FOREIGN PATENT DOCUMENTS

| | | |
|---|---|---|
| CN | 111258815 | 6/2020 |
| CN | 112182108 | 1/2021 |

* cited by examiner

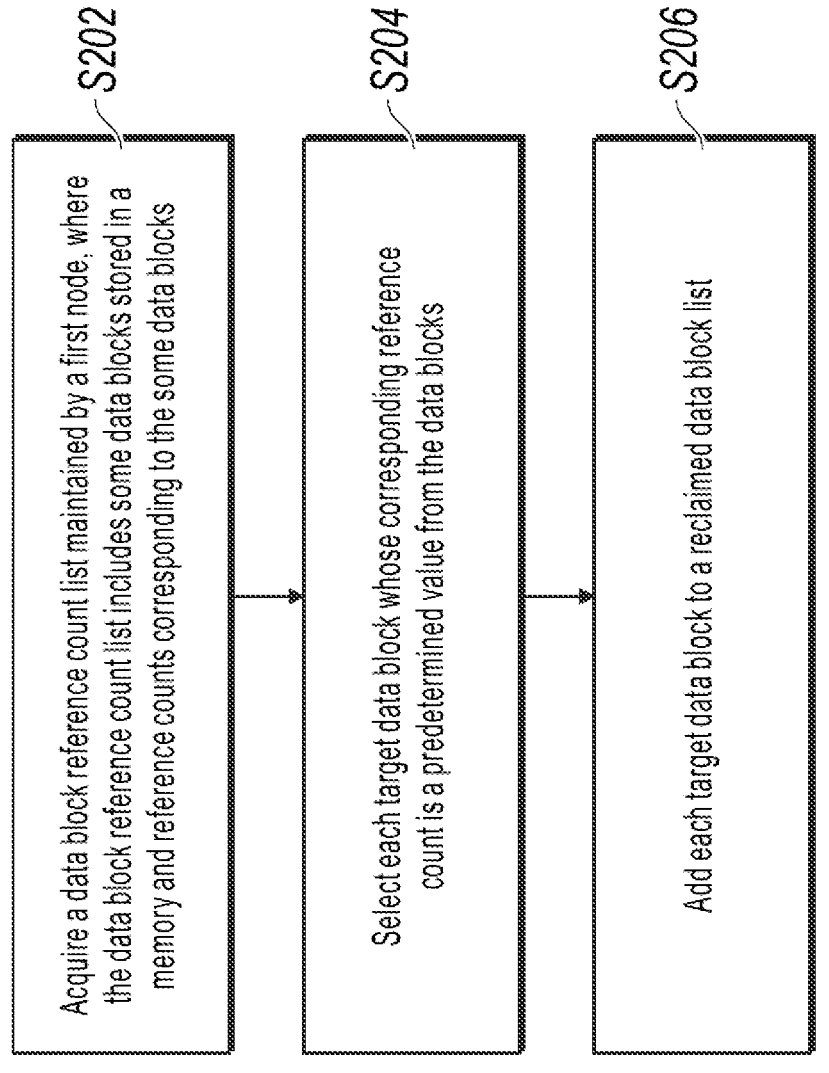

S202

Acquire a data block reference count list maintained by a first node, where the data block reference count list includes some data blocks stored in a memory and reference counts corresponding to the some data blocks

S204

Select each target data block whose corresponding reference count is a predetermined value from the data blocks

S206

Add each target data block to a reclaimed data block list

FIG. 2

STORAGE MANAGEMENT METHODS AND APPARATUSES FOR DISTRIBUTED DATABASE

CROSS-REFERENCE TO RELATED APPLICATIONS

This application claims priority to Chinese Patent Application No. CN202211178127.3, filed on Sep. 27, 2022, which is hereby incorporated by reference in its entirety.

TECHNICAL FIELD

One or more embodiments of this specification relate to the database field, and in particular, to storage management methods and apparatuses for a distributed database.

BACKGROUND

In a storage-sharing distributed database, a plurality of nodes jointly use (also referred to as share) one memory. The memory generally stores a plurality of data blocks. Each node can write data into any data block, or can read data from any data block. The data here can include privacy data. However, at the same moment, only one node writes data into a specific data block, and all other nodes can read data from the data block. In other words, at the same moment, a specific data block can be accessed by a plurality of nodes simultaneously.

Therefore, a solution needs to be provided to effectively manage each data block that can be accessed simultaneously by a plurality of nodes.

SUMMARY

One or more embodiments of this specification describe storage management methods and apparatuses for a distributed database so as to effectively manage each data block shared by a plurality of nodes.

According to a first aspect, a storage management method for a distributed database is provided, where the distributed database includes n nodes, the n nodes jointly use a target memory, and the target memory stores some data blocks; the method is performed by a target node in the n nodes, and includes: sending a block query request to n−1 nodes except the target node in the n nodes; receiving n−1 to-be-reclaimed data block sets from the n−1 nodes; combining a to-be-reclaimed data block set maintained by the target node and the received n−1 data block sets to obtain a combined data block set; sending the combined data block set to the n−1 nodes such that each of the n−1 nodes removes a data block used by the node from the combined data block set, and provides an obtained filtered data block set to the target node; using the filtered data block set obtained after the target node removes the data block used by the target node and the n−1 filtered data block sets sent by the n−1 nodes as n target data block sets, and determining an overlapping data block of the n target data block sets; and reclaiming the overlapping data block.

According to a second aspect, a storage management method for a distributed database is provided, where the distributed database includes n nodes, the n nodes jointly use a target memory, and the target memory stores some data blocks; the method is performed by any first node except a target node in the n nodes, and includes: receiving a block query request from the target node; determining a to-be-reclaimed data block set and providing the to-be-reclaimed data block set to the target node; receiving a combined data block set from the target node, where the combined data block set is obtained by the target node by combining n to-be-reclaimed data block sets corresponding to the n nodes; removing a data block used by the first node from the combined data block set to obtain a filtered data block set; and sending the filtered data block set to the target node such that the target node determines an overlapping data block of n filtered data block sets corresponding to the n nodes, and reclaims the overlapping data.

According to a third aspect, a storage management apparatus for a distributed database is provided, where the distributed database includes n nodes, the n nodes jointly use a target memory, and the target memory stores some data blocks; the apparatus is disposed in a target node in the n nodes, and includes: a sending unit, configured to send a block query request to n−1 nodes except the target node in the n nodes; a receiving unit, configured to receive n−1 to-be-reclaimed data block sets from the n−1 nodes; a combining unit, configured to combine a to-be-reclaimed data block set maintained by the target node and the received n−1 data block sets to obtain a combined data block set, where the sending unit is further configured to send the combined data block set to the n−1 nodes such that each of the n−1 nodes removes a data block used by the node from the combined data block set, and provides an obtained filtered data block set to the target node; a determination unit, configured to use the filtered data block set obtained after the target node removes the data block used by the target node and the n−1 filtered data block sets sent by the n−1 nodes as n target data block sets, and determine an overlapping data block of the n target data block sets; and a processing unit, configured to reclaim the overlapping data block.

According to a fourth aspect, a storage management apparatus for a distributed database is provided, where the distributed database includes n nodes, the n nodes jointly use a target memory, and the target memory stores some data blocks; the apparatus is disposed in any first node except a target node in the n nodes, and includes: a receiving unit, configured to receive a block query request from the target node; a determination unit, configured to determine a to-be-reclaimed data block set and provide the to-be-reclaimed data block set to the target node, where the receiving unit is further configured to receive a combined data block set from the target node, where the combined data block set is obtained by the target node by combining n to-be-reclaimed data block sets corresponding to the n nodes; a removing unit, configured to remove a data block used by the first node from the combined data block set to obtain a filtered data block set; and a sending unit, configured to send the filtered data block set to the target node such that the target node determines an overlapping data block of n filtered data block sets corresponding to the n nodes, and reclaims the overlapping data.

According to a fifth aspect, a computer storage medium is provided. The computer storage medium stores a computer program, and when the computer program is executed on a computer, the computer is enabled to perform the method according to the first aspect or the second aspect.

According to a sixth aspect, a computing device is provided, including a memory and a processor. The memory stores executable code, and the processor executes the executable code to implement the method according to the first aspect or the second aspect.

According to the storage management methods and apparatuses for a distributed database provided in one or more embodiments of this specification, management of each data block shared by a plurality of nodes is divided into two levels. A first level is management inside a single node, that is, each node maintains a to-be-reclaimed data block set, and the set includes data blocks that are not used by the single node. A second level is management among a plurality of nodes, that is, a target node responsible for reclaiming a data block performs a set operation on to-be-reclaimed data block sets maintained by various nodes so as to acquire overlapping data of the sets, and reclaims the acquired overlapping data. It is worthwhile to note that, according to the two-level management method, each data block shared by a plurality of nodes can be effectively managed.

BRIEF DESCRIPTION OF DRAWINGS

To describe the technical solutions in some embodiments of this specification more clearly, the following briefly describes the accompanying drawings needed for describing some embodiments. Clearly, the accompanying drawings in the following description are merely some embodiments of this specification, and a person of ordinary skill in the art can still derive other drawings from these accompanying drawings without creative efforts.

FIG. 2 is a flowchart illustrating a method for updating a reclaimed data block list, according to some embodiments;

DESCRIPTION OF EMBODIMENTS

The solutions provided in this specification are described below with reference to the accompanying drawings.

In a conventional technology, each data block shared by a plurality of nodes is managed mainly by using the following two methods.

1. Count-based method. The count here includes but is not limited to a reference count, an indirect reference count, a weighted reference count, etc. Specifically, a global reference count is maintained in a single node, that is, a usage status of each data block in the memory by all nodes is maintained. However, in a distributed environment, since a message may be blocked or delayed in a network, an error may occur in accurately passing a reference count between nodes. It should be understood that if a count is omitted during addition, an error occurs in reclaiming a data block. In addition, maintenance costs of the method are relatively high.

2. Tracking-based method, including tag deletion, tag collation, a tag tree, etc. For example, tag deletion includes two phases: tagging and deleting. In the tagging phase, tags are attached to data blocks used by all nodes. Then, in the deleting phase, all untagged data blocks (i.e., unused data blocks) are reclaimed. Tag collation and tag tree are similar to tag deletion. It is worthwhile to note that, in such a method, tagging of a data block is usually performed by a central node. In other words, the central node tags the use of each data block by all nodes. Consequently, a lot of time is consumed and overheads are heavy, easily bringing a performance bottleneck to a database system, and affecting normal allocation and writing of a data block.

Since the above-mentioned two methods have corresponding disadvantages, the inventor of this application proposes a two-level management method to manage each data block shared by a plurality of nodes. A first level is management inside a single node, that is, each node maintains a to-be-reclaimed data block set, and the set includes data blocks that are not used by the single node. A second level is management among a plurality of nodes, that is, a target node responsible for reclaiming a data block performs a set operation on to-be-reclaimed data block sets maintained by various nodes so as to acquire overlapping data of the sets, and reclaims the acquired overlapping data. It is worthwhile to note that, the two-level management method can be used to alleviate the problems existing in both of the above-mentioned two methods, thereby implementing effective management of each data block shared by a plurality of nodes.

The solutions provided in some embodiments of this specification are described below in detail.

Figure 1:
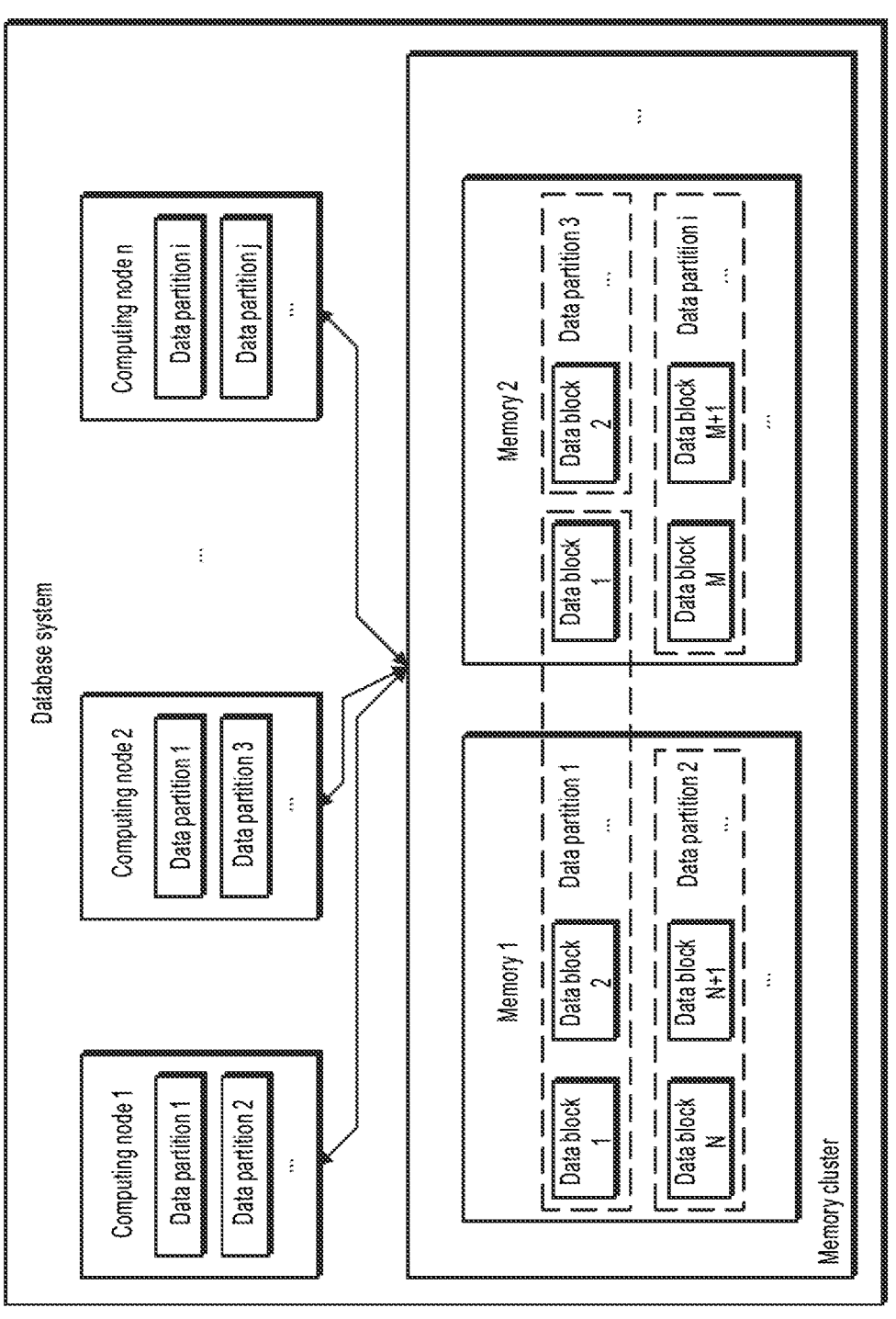
FIG. 1 is a schematic diagram illustrating an implementation scenario, according to some embodiments disclosed in this specification.

FIG. 1 is a schematic diagram illustrating an implementation scenario, according to some embodiments disclosed in this specification. In FIG. 1, a distributed database can include n computing nodes (nodes for short), and some data partitions can be allocated to each node, where each data partition is obtained by partitioning a data table based on a partition key. Data partitions obtained by partitioning the same data table can be respectively allocated to different nodes.

The above-mentioned n nodes can share a plurality of memories, where each memory stores some data blocks, and each data block includes data in a data partition allocated to a node. Generally, one data partition can be formed based on data in a plurality of data blocks, and the plurality of data blocks here can belong to different memories.

In FIG. 1, each of the n nodes can maintain a to-be-reclaimed data block set. After receiving a block query request sent by a target node (any one of the n nodes) that is used to reclaim a data block, each of the n nodes provides the to-be-reclaimed data block set to the target node. The target node can combine to-be-reclaimed data block sets corresponding to the n nodes, and provide an obtained combined data block set to other n−1 nodes. Then, each of the n nodes can remove a data block used by the node from the combined data block set to obtain a filtered data block set and provide the filtered data block set to the target node. The target node uses n filtered data block sets corresponding to the n nodes as n target data block sets, and acquires and reclaims an overlapping data block of the n target data block sets.

In an example, there can be a plurality of target nodes such that the plurality of target nodes can perform the above-mentioned reclaiming processing in parallel, thereby greatly improving data block reclaiming efficiency.

In addition, the to-be-reclaimed data block set maintained by each of the n nodes can be determined based on a reclaimed data block list maintained by the node, and the reclaimed data block list is periodically updated by a corresponding node. The following uses any first node in the n nodes as an example to describe a method for updating a reclaimed data block list by the first node.

FIG. 2 is a flowchart illustrating a method for updating a reclaimed data block list, according to some embodiments.

The method can be performed by any first node in FIG. 1. As shown in FIG. 2, the method can include the following steps:

Step 202: Acquire a data block reference count list maintained by the first node, where the data block reference count list includes some data blocks stored in a memory and reference counts corresponding to the some data blocks, and the reference count is used to indicate a usage status of a corresponding data block to the first node.

It should be understood that, when the n nodes share a plurality of memories, the data block reference count list includes each data block stored in each memory, that is, includes all data blocks shared by the n nodes.

A reference count of each of the some data blocks increases when data of any data partition allocated to the first node are included in the first data block, or decreases when data of any data partition allocated to the first node are deleted from the first data block.

Step 204: Select each target data block whose corresponding reference count is a predetermined value from the data blocks.

Here, the reference count being a predetermined value actually means that the first node does not use the data block. To be specific, the data in each data partition allocated to the first node are not included in the first data block.

In an example, the above-mentioned predetermined value can be 0.

In another example, the above-mentioned predetermined value can alternatively be another special value.

Step 206: Add each target data block to a reclaimed data block list.

To avoid a problem that a data block is incorrectly reclaimed, in this solution, before each target data block is added to the reclaimed data block list, correctness check can be further performed on each target data block.

Using any first target data block in the target data blocks as an example, a corresponding correctness check method can include: sequentially traversing data partitions allocated to the first node, and determining whether data in each data partition are included in the first target data block, where if none of the data in the data partitions is included in the first target data block, the correctness check of the first target data block succeeds; or if the data in any one of the data partitions are included in the first target data block, the correctness check of the first target data block fails.

It should be understood that, with reference to the correctness check method for the first target data block, correctness check can be performed on each of the target data blocks. Then, a target data block passing the correctness check in the target data blocks can be added to the reclaimed data block list.

It is worthwhile to note that, repeatedly performing step 202 to step 206 can implement periodic update of the reclaimed data block list maintained by the first node.

The method for updating the reclaimed data block list of any node has been described above. The following describes a method in which a target node manages each data block shared by a plurality of nodes based on a reclaimed data block list maintained by each node.

Figure 3:
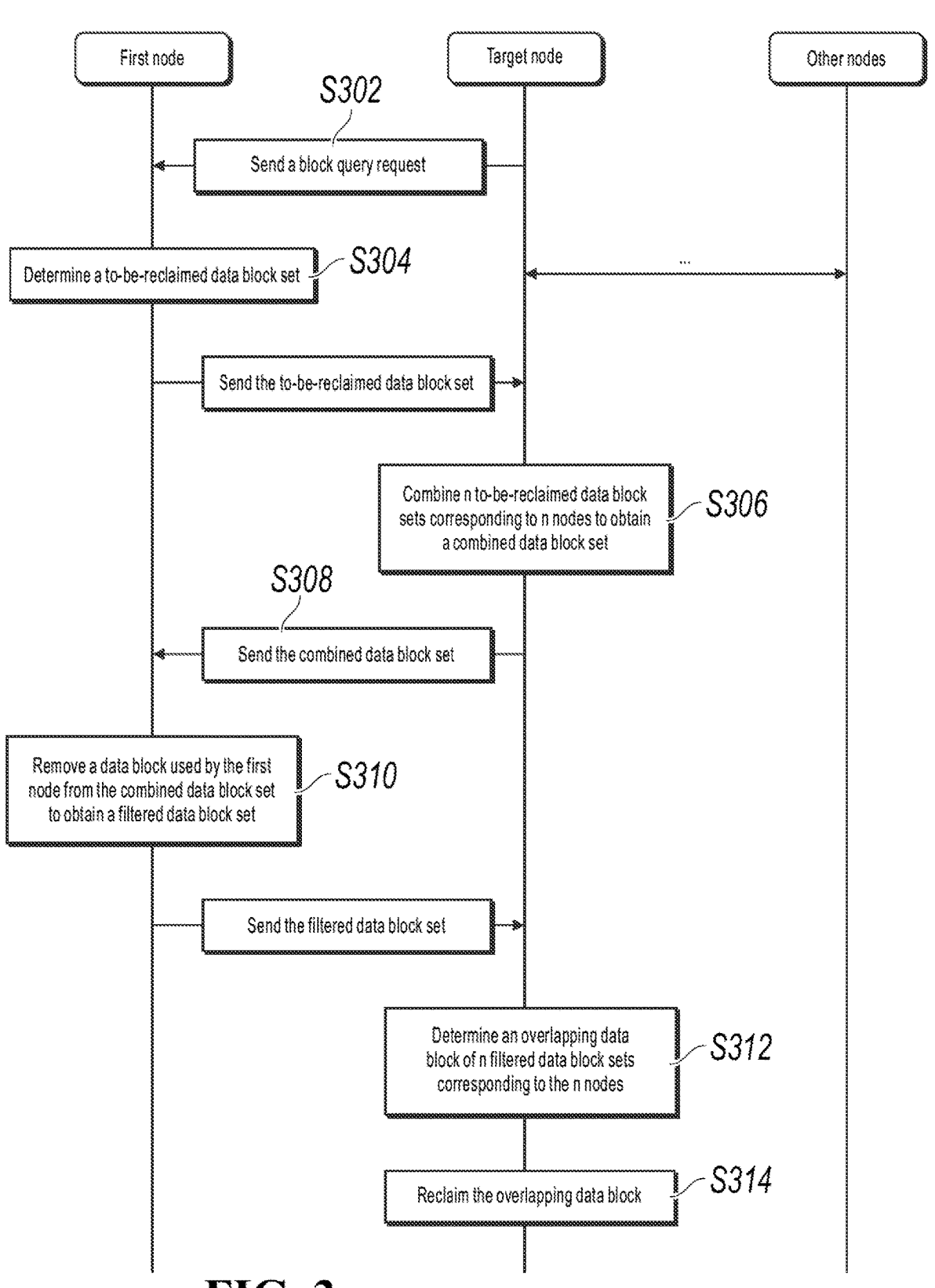
FIG. 3 is an interaction diagram illustrating a storage management method for a distributed database, according to some embodiments.

FIG. 3 is an interaction diagram illustrating a storage management method for a distributed database, according to some embodiments. In FIG. 3, interaction processes between n nodes and a target node are similar. Therefore, FIG. 3 mainly shows interaction steps between any node (referred to as a first node for ease of description) and the target node. For interaction steps between other nodes and the target node, references can be made to the interaction steps between the first node and the target node.

As shown in FIG. 3, the method can include the following steps:

Step 302: The target node sends a block query request to n−1 nodes except the target node in the n nodes.

The above-mentioned target node can be any one of n nodes in a database. There can be 1 or N target nodes, where N is a positive integer, and N>1.

When there are N target nodes, the N target nodes can send the above-mentioned block query request to other n−1 nodes except the N target nodes in parallel.

It should be understood that, when there are N target nodes, each target node can also receive a block query request sent by another target node.

Step 304: Each of the n nodes determines a to-be-reclaimed data block set, and provides the to-be-reclaimed data block set to the target node.

When there is one target node, each of the n nodes can use each target data block (i.e., all data blocks) in a reclaimed data block list maintained by the node as each data block in a to-be-reclaimed data block set.

When there are N target nodes, each of the n nodes determines a to-be-reclaimed data block set corresponding to each target node. That each node determines a to-be-reclaimed data block set corresponding to any first target node includes: selecting each target data block corresponding to the first target node from the target data blocks in the reclaimed data block list maintained by the node; and determining, based on each target data block obtained through filtering, a to-be-reclaimed data block set corresponding to the first target node maintained by the node.

In an example, the selecting each target data block corresponding to the first target node can include: selecting, based on predetermined mapping relationships between N target nodes and all data blocks, each target data block corresponding to the first target node from the target data blocks in the reclaimed data block list maintained by the node.

In another example, the selecting each target data block corresponding to the first target node can include: selecting, from the target data blocks in the reclaimed data block list maintained by the node, each target data block whose modulo result of a corresponding block identifier obtained after a modulo operation is performed on N matches a node number of the first target node as each target data block corresponding to the first target node.

Certainly, in practice, a hash operation or another operation that can convert the block identifier into a digital string with a fixed length can be performed on the block identifier first, and then a modulo operation is performed on N for an operation result, and it is determined whether a modulo result matches a node number of the first target node.

In an example, node numbers of the N target nodes are respectively 0, 1, 2, . . . , and N−1.

It should be understood that, based on the above-mentioned two examples, each node can acquire a to-be-reclaimed data block set corresponding to each target node.

Step 306: The target node combines a to-be-reclaimed data block set maintained by the target node and the received n−1 data block sets to obtain a combined data block set.

Here, when there are N target nodes, each of the N target nodes can combine a to-be-reclaimed data block set acquired by the target node and n−1 data block sets sent by other n−1 nodes.

For a method for acquiring the to-be-reclaimed data block set by each target node, references can be made to the above-mentioned another example. To be specific, a modulo result of a block identifier of a data block in the to-be-reclaimed data block set acquired by the target node after a modulo operation is performed on N matches a node number of the target node.

Step 308: The target node sends the combined data block set to the n–1 nodes.

When there are N target nodes, the N target nodes can send the above-mentioned combined data block set to other n–1 nodes except the N target nodes in parallel.

Step 310: Each of the n nodes removes a data block used by the node from the combined data block set, and provides an obtained filtered data block set to the target node.

In an example, that any first node removes the data block used by the first node from the combined data block set includes: for each data block in the combined data set, the first node queries the reclaimed data block list maintained by the first node to acquire a reference count of the data block. If the reference count of the data block is a predetermined value (for example, 0), it indicates that the data block is not used by the first node. In such case, no processing is performed. If the reference count of the data block is not a predetermined value, it indicates that the data block is used by the first node. In such case, the data block is removed from the combined data set.

In another example, that any first node removes the data block used by the first node from the combined data block set includes: for each data block in the combined data set, sequentially traversing data partitions allocated to the first node, and determining whether data in each data partition are included in the data block. If the data in any one of the data partitions are included in the data block, it indicates that the data block is used by the first node. In such case, the data block is removed from the combined data set. If none of the data in the data partitions is included in the data block, it indicates that the data block is not used. In such case, no processing is performed.

It should be understood that, after the above-mentioned removing step is completed, a filtered data block set maintained by the first node can be obtained. Similarly, a filtered data block set maintained by each node can be obtained.

Step 312: The target node uses the filtered data block set obtained after removing the data block used by the target node and the n–1 filtered data block sets sent by the other n–1 nodes as n target data block sets, and determines an overlapping data block of the n target data block sets.

It should be understood that each target node can acquire a corresponding filtered data block set based on the two examples described in step 310.

For example, the combined data set is U, and n target data block sets can be respectively represented as U1, U2, . . . , and Un.

In an example, the overlapping data block can be obtained by calculating an intersection of the n target data block sets.

Here, when there are N target nodes, each of the N target nodes can determine a corresponding overlapping data block.

Step 314: The target node reclaims the overlapping data block.

Here, when there are N target nodes, each of the N target nodes can reclaim the overlapping data block determined by the target node.

In conclusion, according to the storage management methods and apparatuses for a distributed database provided in some embodiments of this specification, management of each data block in a memory shared by a plurality of nodes is divided into two levels. A first level is management inside a single node, that is, each node maintains a to-be-reclaimed data block set, and the set includes data blocks that are not used by the single node. A second level is management among a plurality of nodes, that is, a target node responsible for reclaiming a data block performs a set operation on to-be-reclaimed data block sets maintained by various nodes so as to acquire overlapping data of the sets, and reclaims the acquired overlapping data. It is worthwhile to note that, according to the two-level management method, each data block shared by a plurality of nodes can be effectively managed.

In addition, in this solution, the N target nodes reclaim the data block in parallel, thereby alleviating a performance bottleneck problem existing when a single target node reclaims a data block, and further improving data block reclaiming efficiency. In addition, in this solution, a parallelism degree can be flexibly set by adjusting a quantity of target nodes.

Figure 4:
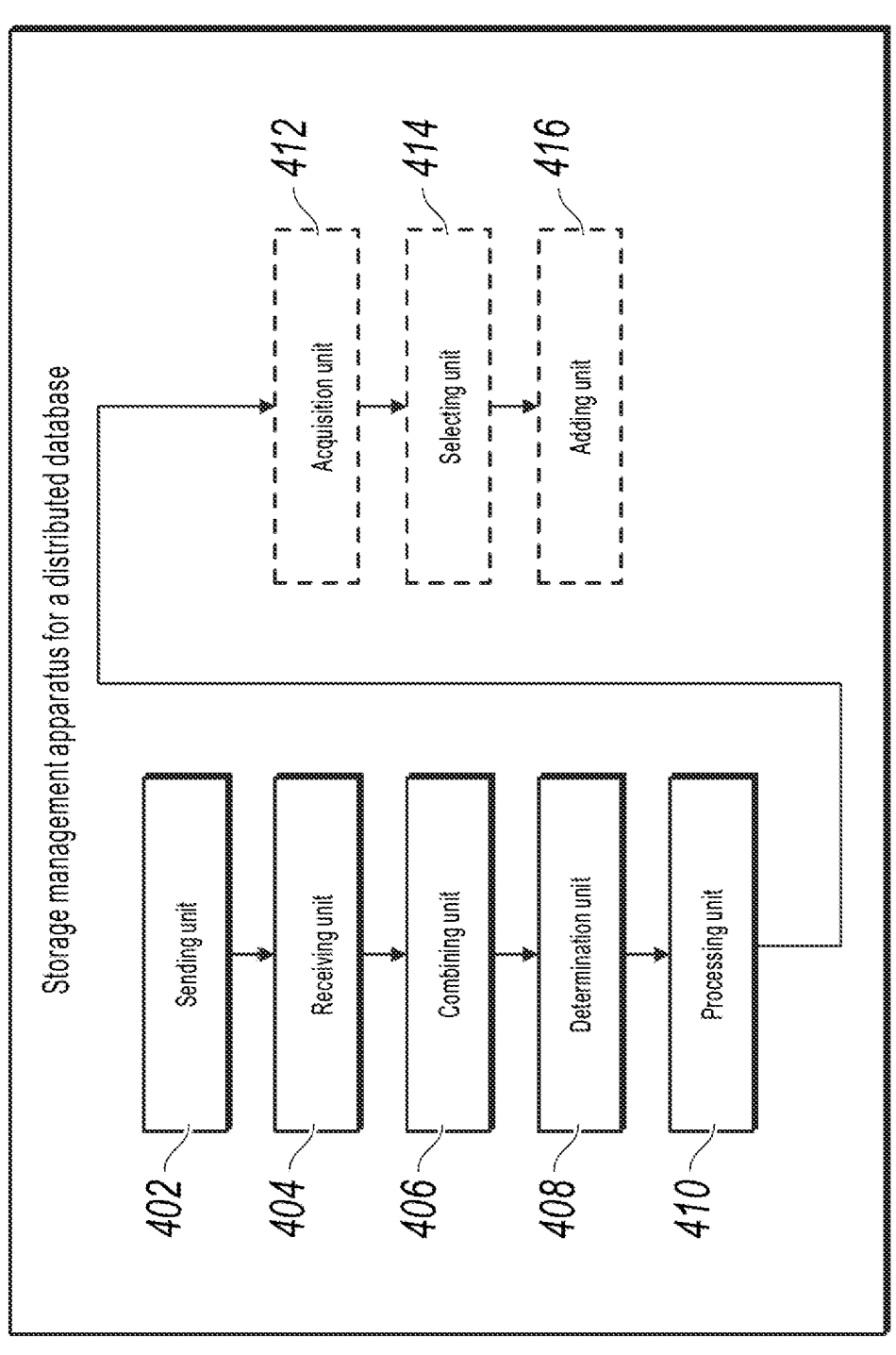
FIG. 4 is a schematic diagram illustrating a storage management apparatus for a distributed database, according to some embodiments.

Corresponding to the above-mentioned storage management method for a distributed database, some embodiments of this specification further provide a storage management apparatus for a distributed database, where the distributed database includes n nodes, the n nodes jointly use a target memory, and the target memory stores some data blocks. The apparatus is disposed in a target node in the n nodes. As shown in FIG. 4, the apparatus can include: a sending unit 402, configured to send a block query request to n–1 nodes except the target node in the n nodes; a receiving unit 404, configured to receive n–1 to-be-reclaimed data block sets from the n–1 nodes, where there can be N target nodes and the some data blocks have a mapping relationship with the N target nodes; each data block in a to-be-reclaimed data block set received by any first target node in the N target nodes corresponds to the first target node; in an example, the data blocks in the to-be-reclaimed data block set received by the first target node include a second data block; and a modulo result of a block identifier of the second data block obtained after a modulo operation is performed on N matches a node number of the first target node; a combining unit 406, configured to combine a to-be-reclaimed data block set maintained by the target node and the received n–1 data block sets to obtain a combined data block set, where the sending unit 402 is further configured to send the combined data block set to the n–1 nodes such that each of the n–1 nodes removes a data block used by the node from the combined data block set, and provides an obtained filtered data block set to the target node; a determination unit 408, configured to use the filtered data block set obtained after the target node removes the data block used by the target node and the n–1 filtered data block sets sent by the n–1 nodes as n target data block sets, and determine an overlapping data block of the n target data block sets; and a processing unit 410, configured to reclaim the overlapping data block.

Optionally, the apparatus can further include: an acquisition unit 412, configured to acquire a data block reference count list maintained by the target node, where the data block reference count list includes the some data blocks and reference counts corresponding to the some data blocks, and the reference count is used to indicate a usage status of a corresponding data block to the target node, where the some data blocks include a first data block; and a reference count of the first data block increases when data of any data partition allocated to the target node are included in the first data block, or decreases when data of any data partition allocated to the target node are deleted from the first data block; a selecting unit 414, configured to select each target data block whose corresponding reference count is a predetermined value from the data blocks; and an adding unit 416, configured to add each target data block to a reclaimed data block list, where the reclaimed data block list is used to determine the to-be-reclaimed data block set maintained by the target node.

The adding unit 416 is specifically configured to: perform correctness check on each target data block; and in response to that the correctness check succeeds, add each target data block to the reclaimed data block list, where the target data blocks include a first target data block.

The adding unit 416 is further specifically configured to: sequentially traverse data partitions allocated to the target node, and determine whether data in each data partition are included in the first target data block, where if none of the data in the data partitions is included in the first target data block, the correctness check of the first target data block succeeds.

The functions of the functional modules of the apparatus in some above-mentioned embodiments of this specification can be implemented by using the steps of some above-mentioned method embodiments. Therefore, a specific working process of the apparatus provided in some embodiments of this specification is omitted here for simplicity.

According to the storage management apparatus for a distributed database provided in some embodiments of this specification, each data block shared by a plurality of nodes can be effectively managed.

Figure 5:
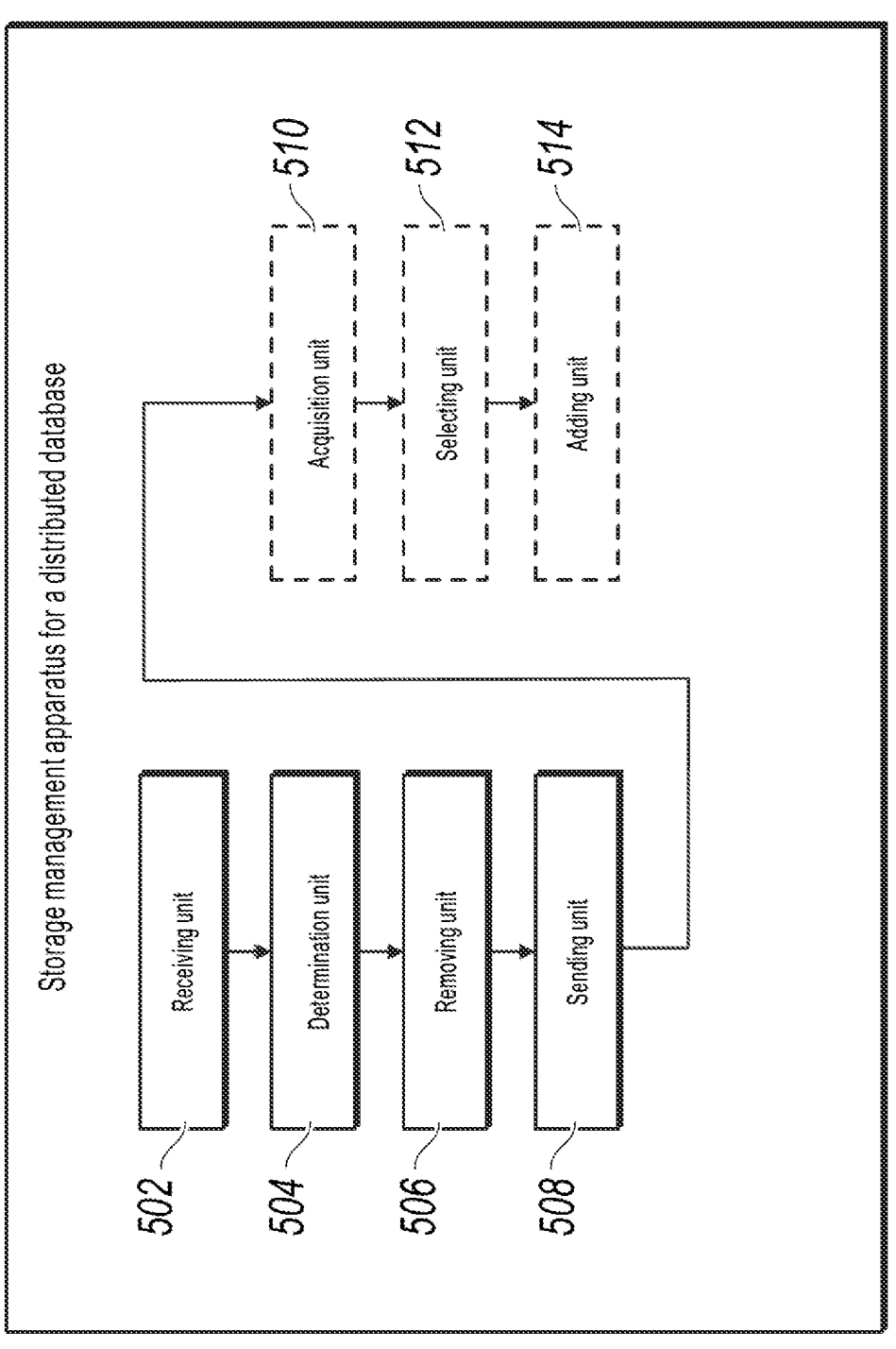
FIG. 5 is a schematic diagram illustrating a storage management apparatus for a distributed database, according to some other embodiments.

Corresponding to the above-mentioned storage management method for a distributed database, some embodiments of this specification further provide a storage management apparatus for a distributed database, where the distributed database includes n nodes, the n nodes jointly use a target memory, and the target memory stores some data blocks. The apparatus is disposed in any first node except a target node in the n nodes. As shown in FIG. 5, the apparatus can include: a receiving unit 502, configured to receive a block query request from the target node; a determination unit 504, configured to determine a to-be-reclaimed data block set and provide the to-be-reclaimed data block set to the target node, where the determination unit 504 is specifically configured to: select each target data block corresponding to the target node from the target data blocks in the reclaimed data block list; and determine, based on each target data block obtained through filtering, the to-be-reclaimed data block set maintained by the first node; the determination unit 504 is further specifically configured to: select, from the target data blocks in the reclaimed data block list, each target data block whose modulo result of a corresponding block identifier obtained after a modulo operation is performed on N matches a node number of the target node as each target data block corresponding to the target node, where N is a quantity of target nodes; the receiving unit 502 is further configured to receive a combined data block set from the target node, where the combined data block set is obtained by the target node by combining n to-be-reclaimed data block sets corresponding to the n nodes; a removing unit 506, configured to remove a data block used by the first node from the combined data block set to obtain a filtered data block set; and a sending unit 508, configured to send the filtered data block set to the target node such that the target node determines an overlapping data block of n filtered data block sets corresponding to the n nodes, and reclaims the overlapping data.

Optionally, the apparatus can further include: an acquisition unit 510, configured to acquire a data block reference count list maintained by the first node, where the data block reference count list includes the some data blocks and reference counts corresponding to the some data blocks, and the reference count is used to indicate a usage status of a corresponding data block to the first node; a selecting unit 512, configured to select each target data block whose corresponding reference count is a predetermined value from the data blocks; and an adding unit 514, configured to add each target data block to a reclaimed data block list, where the reclaimed data block list is used to determine the to-be-reclaimed data block set maintained by the first node.

The adding unit 514 is specifically configured to: perform correctness check on each target data block; and in response to that the correctness check succeeds, add each target data block to the reclaimed data block list.

The functions of the functional modules of the apparatus in some above-mentioned embodiments of this specification can be implemented by using the steps of some above-mentioned method embodiments. Therefore, a specific working process of the apparatus provided in some embodiments of this specification is omitted here for simplicity.

According to the storage management apparatus for a distributed database provided in some embodiments of this specification, each data block shared by a plurality of nodes can be effectively managed.

According to some embodiments in another aspect, a computer-readable storage medium is further provided, where the computer-readable storage medium stores a computer program, and when the computer program is executed in a computer, the computer is enabled to perform the method described with reference to FIG. 3.

According to some embodiments in yet another aspect, a computing device is further provided, including a memory and a processor, where the memory stores executable code, and the processor executes the executable code to implement the methods described with reference to FIG. 3.

Some embodiments of this specification are described in a progressive way. For same or similar parts of the embodiments, mutual references can be made to the embodiments. Each embodiment focuses on a difference from other embodiments. Particularly, some device embodiments are briefly described since they are basically similar to some method embodiments. For related parts, references can be made to related descriptions in the method embodiments.

Method or algorithm steps described with reference to the content disclosed in this specification can be implemented by hardware, or can be implemented by the processor by executing a software instruction. The software instruction can include a corresponding software module. The software module can be stored in a RAM memory, a flash memory, a ROM memory, an EPROM memory, an EEPROM memory, a register, a hard disk, a removable hard disk, a CD-ROM, or any other form of storage medium well-known in the art. An example storage medium is coupled to a processor such that the processor can read information from the storage medium and can write information into the storage medium. Certainly, the storage medium can alternatively be a component of the processor. The processor and the storage medium can be located in the ASIC. In addition, the ASIC can be located in a server. Certainly, the processor and the storage medium can alternatively exist in the server as discrete components.

A person skilled in the art should be aware that in the above-mentioned one or more examples, functions described in this application can be implemented by hardware, software, firmware, or any combination thereof. When these functions are implemented by software, they can be stored in a computer-readable medium or transmitted as one or more instructions or code on the computer-readable medium. The computer-readable medium includes a computer storage medium and a communication medium, where the communication medium includes any medium that enables a computer program to be transmitted from one place to another. The storage medium can be any usable medium accessible to a general-purpose or special-purpose computer.

Some specific embodiments of this specification are described above. Other embodiments fall within the scope of the appended claims. In some cases, actions or steps described in the claims can be performed in a sequence different from that in some embodiments and desired results can still be achieved. In addition, processes described in the accompanying drawings do not necessarily need a specific order or a sequential order shown to achieve the desired results. In some implementations, multi-tasking and parallel processing are also possible or may be advantageous.

The objectives, technical solutions, and beneficial effects of this specification are further described in detail in the above-mentioned specific implementations. It should be understood that the above-mentioned descriptions are merely some specific implementations of this specification, but are not intended to limit the protection scope of this specification. Any modification, equivalent replacement, or improvement made based on the technical solutions in this specification shall fall within the protection scope of this specification.

What is claimed is:

1. A computer-implemented method for distributed database storage management, comprising:

sending, by a target node of a distributed database, a block query request to n−1 nodes of the n nodes of the distributed database, the n−1 nodes excluding the target node, wherein a target memory is jointly used by the n nodes, and wherein the target memory stores a portion of data blocks;

receiving, by the target node and as received n−1 data block sets, n−1 to-be-reclaimed data block sets from the n−1 nodes, wherein each node maintains a respective to-be-reclaimed data block set comprising data blocks unused by a respective single node, wherein the respective to-be-reclaimed data block set is determined based on a reclaimed data block list maintained by the node, the reclaimed data block list being periodically updated by a corresponding node;

combining, by the target node, a to-be-reclaimed data block set maintained by the target node and the received n−1 data block sets to obtain a combined data block set;

sending, by the target node, the combined data block set to the n−1 nodes such that each of the n−1 nodes removes a data block from the combined data block set and provides an obtained filtered data block set to the target node;

using, by the target node, the obtained filtered data block set obtained after the target node removes the data block used by the target node and an n−1 filtered data block set sent by the n−1 nodes as n target data block sets;

determining an overlapping data block of the n target data block sets; and reclaiming, by the target node, the overlapping data block for alleviating a performance bottleneck, wherein before reclaiming the overlapping data block comprises performing a correctness check on the overlapping data block, comprising:

sequentially traversing data partitions allocated to the target node; and determining that no data in the data partitions is comprised in the overlapping data block.

2. The computer-implemented method of claim 1, comprising:

acquiring a data block reference count list maintained by the target node, wherein the data block reference count list comprises the portion of data blocks and reference counts corresponding to the portion of data blocks, and wherein the reference count is used to indicate a usage status of a corresponding data block to the target node;

selecting each target data block whose corresponding reference count is a predetermined value from the portion of data blocks; and adding each target data block to a reclaimed data block list, wherein the reclaimed data block list is used to determine the to-be-reclaimed data block set maintained by the target node.

3. The computer-implemented method of claim 2, wherein adding each target data block to a reclaimed data block list, comprises:

performing correctness check on each target data block; and in response to that the correctness check succeeds, adding each target data block to the reclaimed data block list.

4. The computer-implemented method of claim 3, wherein:

target data blocks comprise a first target data block.

5. The computer-implemented method of claim 4, wherein:

performing correctness check on each target data block, comprises:

sequentially traversing the data partitions allocated to the target node; and determining whether data in each data partition are comprised in the first target data block, wherein if none of the data in the data partitions is comprised in the first target data block, the correctness check of the first target data block succeeds.

6. The computer-implemented method of claim 2, wherein:

the portion of data blocks comprise a first data block; and a reference count of the first data block increases when data of any data partition allocated to the target node are comprised in the first data block or decreases when data of any data partition allocated to the target node are deleted from the first data block.

7. The computer-implemented method of claim 1, wherein:

there are n target nodes and the n target nodes operate in parallel.

8. The computer-implemented method of claim 7, wherein:

the portion of data blocks have a mapping relationship with the n target nodes; and each data block in a to-be-reclaimed data block set received by any first target node in the n target nodes corresponds to the first target node.

9. The computer-implemented method of claim 8, wherein:

data blocks in the to-be-reclaimed data block set received by the first target node comprise a second data block.

10. The computer-implemented method of claim 9, wherein:

a modulo result of a block identifier of the second data block is obtained after a modulo operation is performed on n matches a node number of the first target node.

11. A non-transitory, computer-readable medium storing one or more instructions executable by a computer system to perform one or more operations for distributed database storage management, comprising:

sending, by a target node of a distributed database, a block query request to n−1 nodes of the n nodes of the distributed database, the n−1 nodes excluding the target node, wherein a target memory is jointly used by the n nodes, and wherein the target memory stores a portion of data blocks;

receiving, by the target node and as received n−1 data block sets, n−1 to-be-reclaimed data block sets from the n−1 nodes, wherein each node maintains a respective to-be-reclaimed data block set comprising data blocks unused by a respective single node, wherein the respective to-be-reclaimed data block set is determined based on a reclaimed data block list maintained by the node, the reclaimed data block list being periodically updated by a corresponding node;

combining, by the target node, a to-be-reclaimed data block set maintained by the target node and the received n−1 data block sets to obtain a combined data block set;

sending, by the target node, the combined data block set to the n−1 nodes, such that each of the n−1 nodes removes a data block from the combined data block set and provides an obtained filtered data block set to the target node;

using, by the target node, the obtained filtered data block set obtained after the target node removes the data block used by the target node and an n−1 filtered data block set sent by the n−1 nodes as n target data block sets;

determining an overlapping data block of the n target data block sets; and reclaiming, by the target node, the overlapping data block for alleviating a performance bottleneck, wherein before reclaiming the overlapping data block comprises performing a correctness check on the overlapping data block, comprising:

sequentially traversing data partitions allocated to the target node; and determining that no data in the data partitions is comprised in the overlapping data block.

12. The non-transitory, computer-readable medium of claim 11, comprising:

acquiring a data block reference count list maintained by the target node, wherein the data block reference count list comprises the portion of data blocks and reference counts corresponding to the portion of data blocks, and wherein the reference count is used to indicate a usage status of a corresponding data block to the target node;

selecting each target data block whose corresponding reference count is a predetermined value from the portion of data blocks; and adding each target data block to a reclaimed data block list, wherein the reclaimed data block list is used to determine the to-be-reclaimed data block set maintained by the target node.

13. The non-transitory, computer-readable medium of claim 12, wherein adding each target data block to a reclaimed data block list, comprises:

performing correctness check on each target data block; and in response to that the correctness check succeeds, adding each target data block to the reclaimed data block list.

14. The non-transitory, computer-readable medium of claim 13, wherein:

target data blocks comprise a first target data block.

15. The non-transitory, computer-readable medium of claim 14, wherein:

performing correctness check on each target data block, comprises:

sequentially traversing the data partitions allocated to the target node; and determining whether data in each data partition are comprised in the first target data block, wherein if none of the data in the data partitions is comprised in the first target data block, the correctness check of the first target data block succeeds.

16. The non-transitory, computer-readable medium of claim 12, wherein:

the portion of data blocks comprise a first data block; and a reference count of the first data block increases when data of any data partition allocated to the target node are comprised in the first data block or decreases when data of any data partition allocated to the target node are deleted from the first data block.

17. The non-transitory, computer-readable medium of claim 11, wherein:

there are n target nodes and the n target nodes operate in parallel.

18. The non-transitory, computer-readable medium of claim 17, wherein:

the portion of data blocks have a mapping relationship with the n target nodes; and each data block in a to-be-reclaimed data block set received by any first target node in the n target nodes corresponds to the first target node.

19. The non-transitory, computer-readable medium of claim 18, wherein:

data blocks in the to-be-reclaimed data block set received by the first target node comprise a second data block; and a modulo result of a block identifier of the second data block is obtained after a modulo operation is performed on n matches a node number of the first target node.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for distributed database storage management, comprising:

sending, by a target node of a distributed database, a block query request to n−1 nodes of the n nodes of the distributed database, the n−1 nodes excluding the target node, wherein a target memory is jointly used by the n nodes, and wherein the target memory stores a portion of data blocks;

receiving, by the target node and as received n−1 data block sets, n−1 to-be-reclaimed data block sets from the n−1 nodes, wherein each node maintains a respective to-be-reclaimed data block set comprising data blocks unused by a respective single node, wherein the respective to-be-reclaimed data block set is determined based on a reclaimed data block list maintained by the node, the reclaimed data block list being periodically updated by a corresponding node;

combining, by the target node, a to-be-reclaimed data block set maintained by the target node and the received n−1 data block sets to obtain a combined data block set;

sending, by the target node, the combined data block set to the n−1 nodes, such that each of the n−1 nodes removes a data block from the combined data block set and provides an obtained filtered data block set to the target node;

using, by the target node, the obtained filtered data block set obtained after the target node removes the data block used by the target node and an n−1 filtered data block set sent by the n−1 nodes as n target data block sets;

determining an overlapping data block of the n target data block sets; and reclaiming, by the target node, the overlapping data block for alleviating a performance bottleneck, wherein before reclaiming the overlapping data block comprises performing a correctness check on the overlapping data block, comprising:

sequentially traversing data partitions allocated to the target node; and determining that no data in the data partitions is comprised in the overlapping data block.

* * * * *